United States Patent
Saxena et al.

(10) Patent No.: US 9,792,417 B2
(45) Date of Patent: Oct. 17, 2017

(54) METHODS FOR CONTROLLING SOFTWARE USAGE

(71) Applicant: Infosys Limited, Bangalore (IN)

(72) Inventors: Ashutosh Saxena, Hyderabad (IN); Harigopal K. B. Ponnapalli, Hyderabad (IN); Malakondayya Choudary Gorantla, Parvathipuram (IN); Ina Jain, Jaipur (IN)

(73) Assignee: Infosys Limited, Bangalore (IN)

( * ) Notice: Subject to any disclaimer, the term of this patent is extended or adjusted under 35 U.S.C. 154(b) by 888 days.

(21) Appl. No.: 13/918,523

(22) Filed: Jun. 14, 2013

(65) Prior Publication Data

US 2013/0339251 A1 Dec. 19, 2013

(30) Foreign Application Priority Data

Jun. 15, 2012 (IN) .......................... 2389/CHE/2012

(51) Int. Cl.
*G06F 21/10* (2013.01)
(52) U.S. Cl.
CPC .................................. *G06F 21/10* (2013.01)
(58) Field of Classification Search
CPC ......................... G06F 21/10; G06F 2221/2135
See application file for complete search history.

(56) References Cited

U.S. PATENT DOCUMENTS

| | | | |
|---|---|---|---|
| 5,023,907 A | 6/1991 | Johnson et al. | |
| 6,425,050 B1 * | 7/2002 | Beardsley | G06F 12/0804 711/113 |
| 6,567,915 B1 * | 5/2003 | Guthery | G06Q 20/105 705/17 |
| 6,571,279 B1 * | 5/2003 | Herz | G06F 17/30867 707/999.01 |
| 7,694,139 B2 | 4/2010 | Nachenberg et al. | |

(Continued)

OTHER PUBLICATIONS

Lizard Labs, "XSign & XEnc ActiveX XML Signature and Encryption Components", http://www.lizard-labs.net/xsign_xenc.aspx, 5 pages, visited Jun. 13, 2013.

(Continued)

*Primary Examiner* — Behrang Badii
*Assistant Examiner* — Daniel L Greene
(74) *Attorney, Agent, or Firm* — Klarquist Sparkman, LLP (57) ABSTRACT

Methods for controlling software usage are described. Methods comprise receiving a request for at least one software application license, wherein the request comprises a user count, generating, by the computing apparatus, one or more sets of license data in response to the request, wherein a set of license data comprises at least one of the user count and a corresponding sequence number, signing each of the one or more sets of license data digitally with a private key, embedding a set of signed license data into the software application, receiving user identification data from a user through an input interface associated with the computing apparatus, and validating the user identification data. Additional embodiments incorporate mechanisms for license renewal, user registration and user authentication by means of associating a range of user identification data with the license data.

19 Claims, 5 Drawing Sheets

(56) References Cited

U.S. PATENT DOCUMENTS

| | | | | |
|---|---|---|---|---|
| 2002/0069172 | A1* | 6/2002 | Omshehe | G06F 17/30873 |
| | | | | 705/51 |
| 2002/0091930 | A1* | 7/2002 | Kohl | H04L 9/0894 |
| | | | | 713/182 |
| 2004/0117784 | A1* | 6/2004 | Endoh | G06F 21/10 |
| | | | | 717/169 |
| 2004/0267595 | A1* | 12/2004 | Woodings | G06Q 10/06 |
| | | | | 705/7.14 |
| 2005/0010532 | A1* | 1/2005 | Garibay | G06F 21/10 |
| | | | | 705/59 |
| 2005/0289058 | A1* | 12/2005 | Hoffman | C07K 14/53 |
| | | | | 705/44 |
| 2006/0026105 | A1* | 2/2006 | Endoh | G06F 21/10 |
| | | | | 705/59 |
| 2008/0188308 | A1* | 8/2008 | Shepherd | G07F 17/32 |
| | | | | 463/39 |
| 2009/0031286 | A1 | 1/2009 | Yee et al. | |
| 2011/0251992 | A1* | 10/2011 | Bethlehem | H04L 12/2863 |
| | | | | 707/610 |

OTHER PUBLICATIONS

Oracle Technology Network, "Java XML Digital Signatures", http://java.sun.com/developer/technicalArticles/xml/dig_signatures/, 11 pages, Jul. 2006.

Siddiqui, IBM developerWorks, "Exploring XML Encryption, Part I", http://www.ibm.com/developerworks/xml/library/x-encrypt/, 5 pages, Mar. 1, 2002.

\* cited by examiner

METHODS FOR CONTROLLING SOFTWARE USAGE

FIELD

The invention relates generally to the controlling of software usage. In particular, the invention relates to limiting software usage through the incorporation of a digital signature in software license generation.

BACKGROUND

In general, software licenses dictate permissible uses of their corresponding software. License may impose limitations with respect to time, or usage methods, or the number of users. Strategies for implementing licensing, therefore, seek to make unauthorized duplication and usage of software more difficult.

Perpetual licensing is typically done using one of two types of anti-piracy solutions, including hardware-based solutions, and software-based solutions using client and server technology. Typically, hardware-based solutions provide a higher level of security as they rely on an external vendor controlled device, rather than on the end user's personal computer (PC). One such existing approach is to provide a hardware dongle, typically installed in the parallel port of the computer to provide a software interlock. Without the dongle the software may not execute. However, such a method is relatively expensive and cumbersome as it entails the maintenance of a physical object, which, nonetheless, remains vulnerable to theft by duplication of the hardware.

A software-based protection solution, in contrast, relies on the end user's PC to secure the digital license and maintain adherence to it. Typically, software-based solutions for perpetual licensing enforcement are less expensive than hardware-based solutions, and may rely on product activation based techniques.

One such approach may require a user to enter a serial number or customer identification number during installation of the software. Missing or invalid registration information prevents installation of the software. However, such an approach may be defeated by transferring the serial number or customer identification number to one or more unauthorized users.

Yet another approach requires registering the software with the manufacturer or distributor to obtain an operational code or password necessary for installation of the software. Once the operational code or password is obtained, it may be perpetually transferred along with pirated copies to numerous unauthorized users.

Accordingly, there is a need for an approach to software based licensing control that combines the security of a hardware dongle based approach while removing dependencies on actual physical hardware.

SUMMARY

Embodiments of the present invention include methods for controlling software usage comprising receiving a request for at least one software application license by a computing apparatus comprising at least one processor and a readably coupled memory, wherein the request comprises a user count, generating, by the computing apparatus, one or more sets of license data in response to the request, wherein a set of license data comprises at least one of the user count and a corresponding sequence number, signing each of the one or more sets of license data digitally with a private key, embedding a set of signed license data into the software application, receiving user identification data from a user through an input interface associated with the computing apparatus, and validating the user identification data.

Some embodiments may additionally comprise renewal of the software license by receiving a request comprising an additional user count for at least one license, updating the one or more sets of license data with the additional user count, signing each of the one or more sets of updated license data digitally with a private key, and embedding a set of signed updated license data into the software application.

Some embodiments may additionally comprise associating a user with a license attached to the software application by generating a first number, validating the set of signed license data embedded in the software application against a retrieved set of signed license data, generating user identification data, wherein user identification data includes a user group attribute and a user identification number attribute, and mapping the first number and user identification data to the set of signed license data.

DRAWINGS

These and other features, aspects, and advantages of the present invention will be better understood when the following detailed description is read with reference to the accompanying drawings in which like characters represent like parts throughout the drawings, wherein.

While systems and methods are described herein by way of example and embodiments, those skilled in the art recognize that methods for methods for controlling software usage are not limited to the embodiments or drawings described. It should be understood that the drawings and description are not intended to be limiting to the particular form disclosed. Rather, the intention is to cover all modifications, equivalents and alternatives falling within the spirit and scope of the appended claims. Any headings used herein are for organizational purposes only and are not meant to limit the scope of the description or the claims. As used herein, the word "may" is used in a permissive sense (i.e., meaning having the potential to) rather than the mandatory sense (i.e., meaning must). Similarly, the words "include", "including", and "includes" mean including, but not limited to.

DETAILED DESCRIPTION

The following description is the full and informative description of the best method and system presently contemplated for carrying out the present invention which is known to the inventors at the time of filing the patent application.

The present invention describes a secure licensing model implementation for limiting software application usage to a predefined number of users by a licensor. Embodiments of the licensing model described may be integrated into software applications existing in an organization, and may not be limited to new installs or new registrations of the application by a user. Present implementations may include the generation of secure license files by means of signing the files with a private encryption key, the administration of one or more users authorized to use the software application through registration, authentication and deletion of users and renewal of the license upon request, by updating the secure license files.

Figure 1:
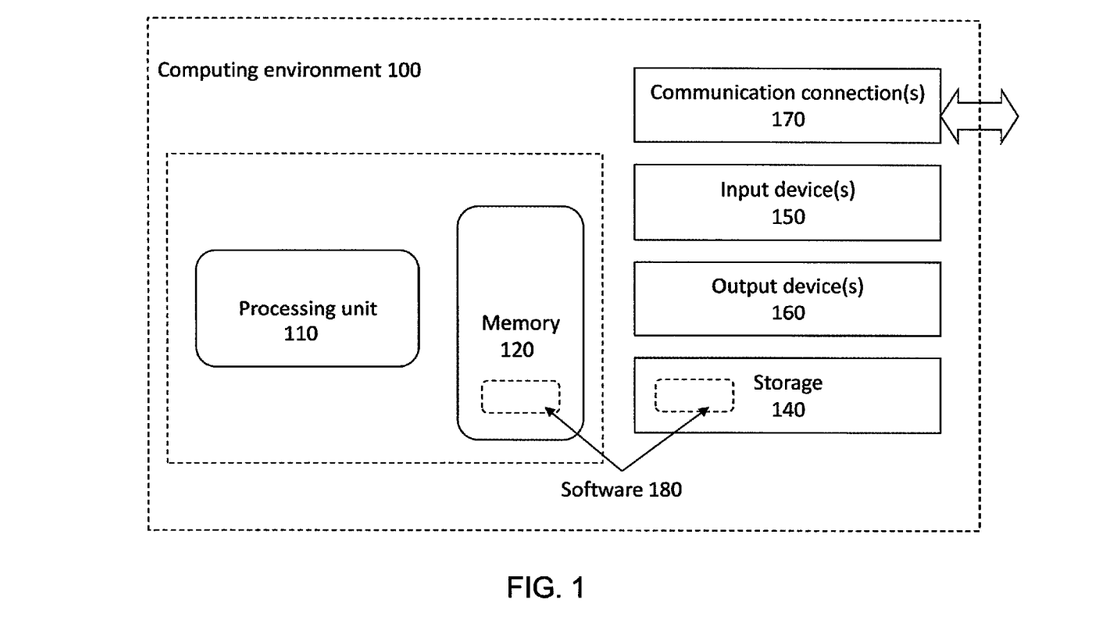
FIG. 1 is an illustration of an exemplary computing environment for the execution of a method for controlling software usage, in accordance with an embodiment.

One or more of the above-described techniques may be implemented in or involve one or more computer systems. FIG. 1 illustrates a generalized example of a computing environment 100. The computing environment 100 is not intended to suggest any limitation as to scope of use or functionality of described embodiments.

With reference to FIG. 1, the computing environment 100 includes at least one processing unit 110 and memory 120. The processing unit 110 executes computer-executable instructions and may be a real or a virtual processor. In a multi-processing system, multiple processing units execute computer-executable instructions to increase processing power. The memory 120 may be volatile memory (e.g., registers, cache, RAM), non-volatile memory (e.g., ROM, EEPROM, flash memory, etc.), or some combination of the two. In some embodiments, the memory 120 stores software 180 implementing described techniques.

A computing environment may have additional features. For example, the computing environment 100 includes storage 140, one or more input devices 150, one or more output devices 160, and one or more communication connections 170. An interconnection mechanism (not shown) such as a bus, controller, or network interconnects the components of the computing environment 100. Typically, operating system software (not shown) provides an operating environment for other software executing in the computing environment 100, and coordinates activities of the components of the computing environment 100.

The storage 140 may be removable or non-removable, and includes magnetic disks, magnetic tapes or cassettes, CD-ROMs, CD-RWs, DVDs, or any other medium which may be used to store information and which may be accessed within the computing environment 100. In some embodiments, the storage 140 stores instructions for the software 180.

The input device(s) 150 may be a touch input device such as a keyboard, mouse, pen, trackball, touch screen, or game controller, a voice input device, a scanning device, a digital camera, or another device that provides input to the computing environment 100. The output device(s) 160 may be a display, printer, speaker, or another device that provides output from the computing environment 100.

The communication connection(s) 170 enable communication over a communication medium to another computing entity. The communication medium conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier. Implementations may be described in the general context of computer-readable media. Computer-readable media are any available media that may be accessed within a computing environment. By way of example, and not limitation, within the computing environment 100, computer-readable media include memory 120, storage 140, communication media, and combinations of any of the above.

Figure 2:
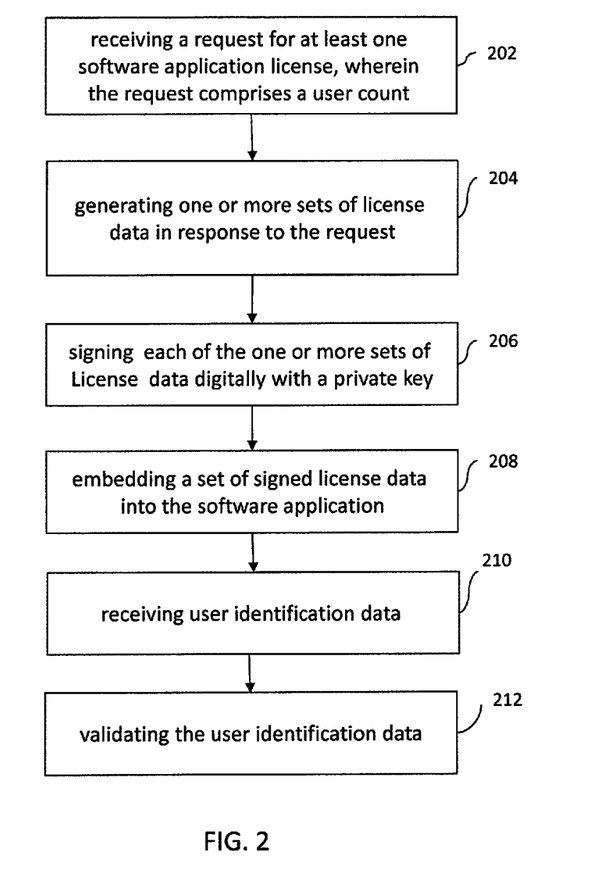
FIG. 2 is an illustrative flow diagram of a method for controlling software usage, in accordance with an embodiment.
Figure 3:
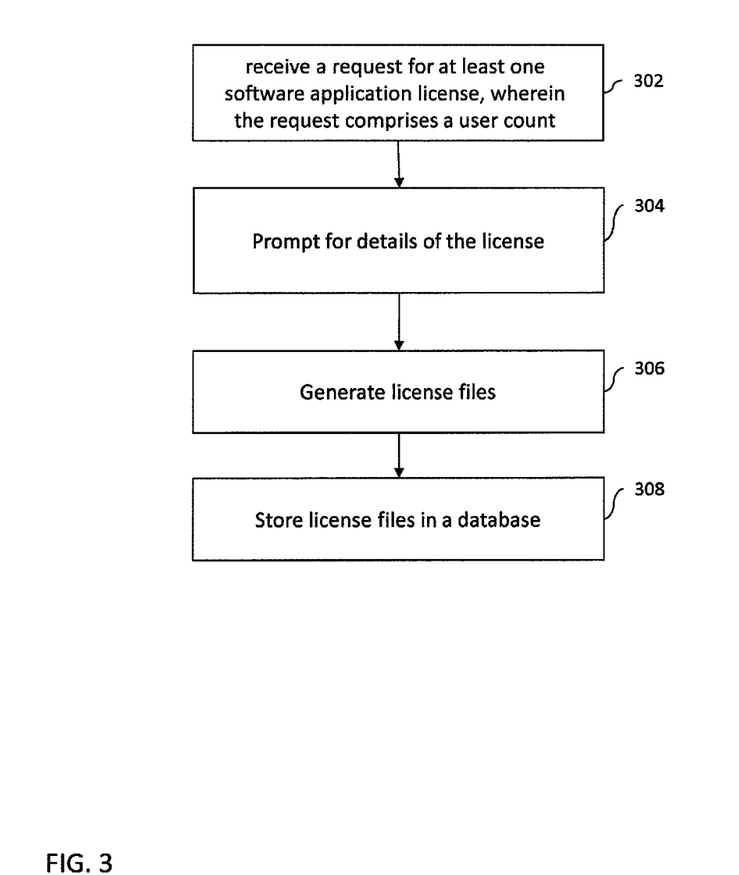
FIG. 3 is an illustrative flow diagram for the generation of license files, in accordance with an embodiment.

Embodiments of the present invention are further detailed with respect to FIG. 2. Referring now to a block 202, steps in the implementation of controlling software usage includes receiving a request for at least one software application license by a computing apparatus comprising at least one processor and a readably coupled memory and the generation of one or more sets of license data in response to the request, as in 204. When a user entity makes a request for one or more application licenses to a vendor, the user may be required to provide a user count that is indicative of the number of licenses of the application that the user entity desires to purchase and deploy. On the basis of the user count, a unique sequence number may be generated and associated with the license. Therefore, the generation of a license by the licensing model may be predicated upon the user count supplied, and is further explicated by means of FIG. 3. As the request and user count is received, as in 302, a prompt may be generated that requests details of the license in question, as in 304. The details requested may include, but not be limited to, the name of the license in question, a version number, a short description of the license, a vendor name, where the vendor is the licensee, a vendor URL that indicates a web presence associated with the licensee and the identity of the user entity to whom the license is to be granted. License data may be generated on the basis of the details entered, as in 306. Generated license data may include the received user details, a security certificate associated with the application, a sequence number, and the user count. The sequence number is a number in an arbitrarily determined range, where the size of the range is equal to the user count. The generated license data may, as in some embodiments, be stored in a database or as an extensible markup language (XML) file associated with the application to be licensed, or as part of a license or application profile in a license management solution involved in administering the licensing model, as in 308.

Referring again to FIG. 2, a next step, as in 206, is that the license data may be digitally signed by the licensor by means of a cryptographic private key. The license data signed refers to the generated license data, and signing the license files may be accomplished by means of a private key using RSA or DSA based techniques. Then, as in 208, the license data may be embedded into the software application. Embedding may include inserting the signed license files into a datastore associated with the application or causing the license files to be installed on installing the software application with which it is associated. Then, as in 210, user identification data may be received by the license management application associated with the licensing model from a user through an input interface. User identification data may consist of a user identification string and a password string. The user identification data entered may be recognizable to the license management application by as a result of a registration procedure previously undertaken by the user entity with the license management application. The registration procedure specified is additionally detailed by means of FIG. 5, below.

Once the user authentication information is received, the received user identification data may then be validated, as in 210 of FIG. 2. Validation may, in accordance with a preferred embodiment, consist of verification of the login credentials of the user, including the previously registered user identification data and password. If the user credentials have been previously registered, the entered credentials may be checked against the extant credentials. In some embodiments, user data may be encrypted on registration. In such an instance, the stored user data is decrypted to obtain the user identification data and compared with the input data. Additionally, in a preferred embodiment, the input credentials may be encrypted and a hash value of the encrypted file calculated. If the hash value of the newly encrypted input data matches the hash value of the extant encrypted data, the user is authenticated. In some embodiments, the sequence number associated with the user identification data may be compared with the sequence number in the license data and the user only authenticated if the sequence numbers match. Symmetric encryption techniques may be used in the encryption of user data, including AES or 3DES based encryption techniques.

Figure 5:
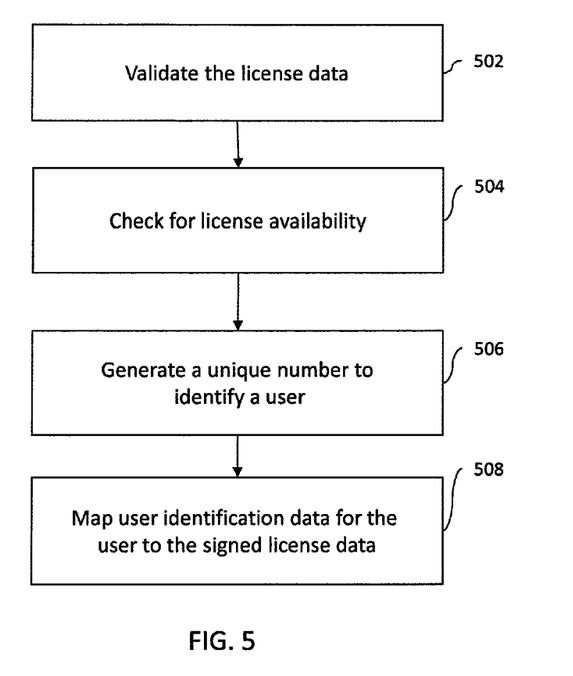
FIG. 5 is an illustrative flow diagram for the validation of a user, in accordance with an embodiment.

User registration, in accordance with a preferred embodiment, is described with reference to FIG. 5. A first step in the registration involves validation of the license data, as in 502. Validation may involve matching the hash value of the signed license data with an expected hash value of the license data. Validation may additionally include, as in 504, checking for the license data for license availability. More specifically, embodiments may maintain an active user count with the license data. User identification data associated with each registered user is, in turn, associated with a sequence number from the range present in the license data, which, together, forms the active user count. When a registration request is received, extant license data is parsed and the total number of active users in the license data is checked. If the requesting user is the first user to apply for registration, the active user count data may be empty and the check is passed. If the active user count has not reached the upper limit of the sequence number range, the requesting user is allowed to register. In some embodiments, if the upper limit of the sequence number range is reached, the requesting user may be prompted to renew the license. If the check passes, a unique number is generated to identify the user, as in 506. In a preferred embodiment, the number associated may be generated by incrementing the extant sequence number. Then, user identification details including at least the information detailed in 210 of FIG. 2, above, may be prompted for. Received user identification data is then linked to the unique number generated. The user registration information, including the unique number and active user count are then keyed to the embedded license data, as in 508 of FIG. 5. In some embodiments, the user registration information received is encrypted prior to association with the license data. In some embodiments, the user information is additionally signed with the private key associated with the stored license data and the hash value of the signed user information is included in the created user identification data.

When a user is to be deleted or deassociated from the license data, the created user identification data corresponding to that user may be removed by the license management solution. In some embodiments, the unique number generated is not removed when the user data is deleted, but is reclaimed for reuse with a new registration request while the active user count is decremented. If the deassociated user is to be restored, the active user count is incremented once more, and the unique number restored.

Figure 4:
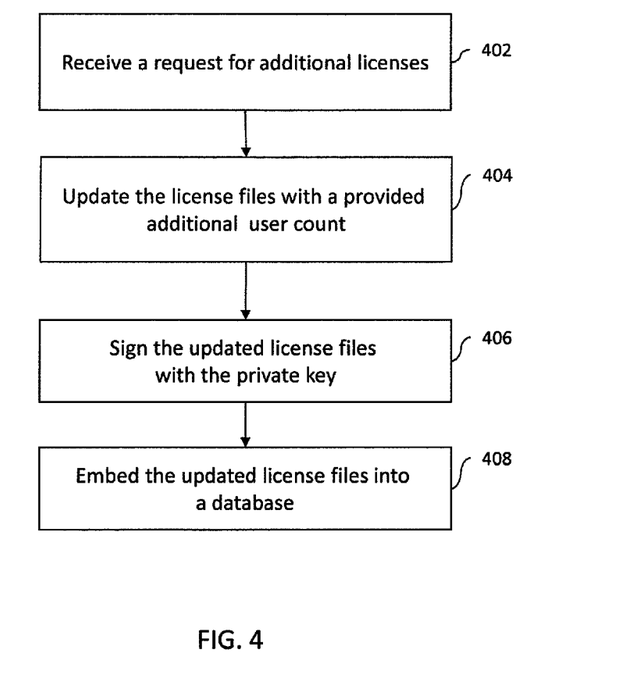
FIG. 4 is an illustrative flow diagram for the renewal of a software license, in accordance with an embodiment.

Some embodiments of the present implementation may incorporate license renewal mechanisms. License renewal is further described with respect to FIG. 4. First, as in 402, when a request for additional licenses is received, the user entity may be prompted for details of the license for which the renewal is to be performed and the new user count. The new user count is used to determine a new sequence number range to be generated. When license details are received, the stored license data associated with the corresponding software application may be retrieved. The license data may then be updated with the new user count input, as in 404. Then, as in 406, the stored license data may be updated. More specifically, the sequence number range associated with the license data is updated and the license data is then re-signed with the private key by the license management solution. The signed and updated license data may then, as in 408, be stored in a database or as an extensible markup language (XML) file associated with the application to be licensed, or as part of a license or application profile in a license management solution involved in administering the licensing model.

Embodiments may find application in the software publishing industry. For example, an implemented license management solution along the lines of the implementation described may allow a vendor to empower an administrator at a user entity to register and authenticate users, while limiting the allowed user range to that predefined by the vendor entity. The presence of the signed license data may be equivalent to a hardware dongle based solution in that a similar level of cryptographic security, including 128 bit RSA encryption, is provided and embedded with the software application and in that the encrypted data is required to be verified by the license management solution before user access is granted.

The present description includes the best presently-contemplated method for carrying out the present invention. Various modifications to the embodiment will be readily apparent to those skilled in the art and some features of the present invention may be used without the corresponding use of other features. Accordingly, the present invention is not intended to be limited to the embodiments shown but is to be accorded the widest scope consistent with the principles and features described herein.

As will be appreciated by those ordinary skilled in the art, the aforementioned example, demonstrations, and method steps may be implemented by suitable code on a processor base system, such as general purpose or special purpose computer. It should also be noted that different implementations of the present technique may perform some or all the steps described herein in different orders or substantially concurrently, that is, in parallel. Furthermore, the functions may be implemented in a variety of programming languages. Such code, as will be appreciated by those of ordinary skilled in the art, may be stored or adapted for storage in one or more tangible machine readable media, such as on memory chips, local or remote hard disks, optical disks or other media, which may be accessed by a processor based system to execute the stored code.

What is claimed is:

1. A computer implemented method for controlling software usage, the method comprising:

receiving a request for at least one software application license for a software application by a computing apparatus comprising at least one processor and a readably coupled memory, wherein the request comprises a user count upper limit;

generating, by the computing apparatus, one or more sets of license data in response to the request, wherein the one or more sets of license data comprise the user count upper limit, a security certificate associated with the software application, and a corresponding sequence number;

signing each of the one or more sets of license data digitally with a private key;

embedding the one or more sets of signed license data into the software application;

performing registration for user identification data comprising a user identification string and a password string, wherein registration comprises (a)-(d):

(a) validating the license data, wherein validating the license data comprises validating the signed license data embedded into the software application;

(b) maintaining an active user count;

(c) checking availability of a license, wherein checking availability comprises comparing the active user count against the user count upper limit; and (d) associating the user identification data with the corresponding sequence number in the signed license data;

receiving a request to access the software application, wherein receiving the request comprises receiving registered user identification data through an input interface associated with the computing apparatus and signed license data;

validating the registered user identification data, wherein validating comprises (e)-(g):

(e) identifying the sequence number associated with the registered user identification data;

(f) comparing the corresponding sequence number associated with the registered user identification data with the corresponding sequence number in the signed license data; and (g) authenticating the registered user identification data, wherein authenticating comprises authenticating only if the corresponding sequence number associated with the registered user identification data and the corresponding sequence number in the signed license data match; and responsive to successfully validating the registered user identification data, providing access to the software application by the user identification string.

2. The computer implemented method as claimed in claim 1, further comprising renewing the license data, wherein renewing comprises:

receiving a request comprising an additional user count for at least one license;

updating the one or more sets of license data with the additional user count;

signing each of the one or more sets of updated license data digitally with a private key; and embedding a set of signed updated license data into the software application.

3. The computer implemented method as claimed in claim 1, wherein:

checking for the availability of a license comprises comparing a stored user count upper limit associated with the corresponding sequence number with the active user count on receiving a request.

4. The computer implemented method as claimed in claim 3, further comprising transmitting a non-availability message to a user by means of an output interface associated with the computing apparatus if the stored user count upper limit associated with the corresponding sequence number matches the active user count.

5. The computer implemented method as claimed in claim 1, further comprising associating a user with the software application, wherein associating comprises:

generating a first number;

validating the one or more sets of signed license data embedded in the software application against a retrieved set of signed license data;

generating user identification data, wherein user identification data includes a user group attribute and a user identification number attribute; and mapping the first number and user identification data to the one or more sets of signed license data.

6. The computer implemented method as claimed in claim 5, further comprising encrypting data comprising the first number and user identification data and storing the encrypted data in a database.

7. The computer implemented method as claimed in claim 6, wherein validating comprises comparing received user identification data with the user identification data.

8. The computer implemented method as claimed in claim 1, further comprising deassociating a user from the software application, wherein deassociating comprises deleting the user identification data.

9. The computer implemented method as claimed in claim 8, further comprising restoring a deassociated user, wherein restoring comprises:

receiving user identification data;

checking for license availability;

generating a second number and assigning the second number to the user identification data received if a license is available; and storing the user identification data in a database.

10. A non-transitory computer readable storage medium having stored thereon computer executable instructions for performing a method for controlling software usage, the method comprising:

receiving a request for at least one software application license for a software application by a computing apparatus comprising at least one processor and a readably coupled memory, wherein the request comprises a user count upper limit;

generating, by the computing apparatus, one or more sets of license data in response to the request, wherein a set of license data comprises the user count upper limit, a security certificate associated with the software application, user details received from a user, and a corresponding sequence number, wherein the corresponding sequence number is in an arbitrarily determined range, and size of the range is equal to the user count upper limit;

signing each of the one or more sets of license data digitally with a private key;

embedding a set of signed license data into the software application;

performing registration for user identification data comprising a user identification string and a password string, wherein registration comprises (a)-(d):

(a) validating the license data;

(b) maintaining an active user count;

(c) checking availability of a license, wherein checking availability comprises comparing the active user count against the user count upper limit; and (d) associating the user identification data with the corresponding sequence number in the signed license data;

receiving a request to access the software application, wherein receiving the request comprises receiving registered user identification data through an input interface associated with the computing apparatus and signed license data;

validating the registered user identification data, wherein validating comprises (e)-(g):

(e) identifying the sequence number associated with the registered user identification data;

(f) comparing the corresponding sequence number associated with the registered user identification data with the corresponding sequence number in the signed license data; and (g) authenticating the registered user identification data, wherein authenticating comprises authenticating only if the corresponding sequence number associated with the registered user identification data and the corresponding sequence number in the signed license data match; and responsive to successfully validating the registered user identification data, providing access to the software application by the user identification string.

11. The non-transitory computer readable storage medium as claimed in claim 10, wherein the method further comprises renewing the license data, wherein renewing comprises:

receiving a request comprising an additional user count for at least one license;

updating the one or more sets of license data with the additional user count;

signing each of the one or more sets of updated license data digitally with a private key; and embedding a set of signed updated license data into the software application.

12. The non-transitory computer readable storage medium as claimed in claim 10, wherein:

checking for the availability of a license comprises comparing a stored user count upper limit associated with the corresponding sequence number with the active user count on receiving a request.

13. The non-transitory computer readable storage medium as claimed in claim 12, wherein the method further comprises transmitting a non-availability message to a user by means of an output interface associated with the computing apparatus if the stored user count upper limit associated with the corresponding sequence number matches the active user count.

14. The non-transitory computer readable storage medium as claimed in claim 10, wherein the method further comprises associating a user with the software application, wherein associating comprises:

generating a first number;

validating the set of signed license data embedded in the software application against a retrieved set of signed license data;

generating user identification data, wherein user identification data includes a user group attribute and a user identification number attribute; and mapping the first number and user identification data to the set of signed license data.

15. The non-transitory computer readable storage medium as claimed in claim 14, wherein the method further comprises encrypting data comprising the first number and user identification data and storing the encrypted data in a database.

16. The non-transitory computer readable storage medium as claimed in claim 15, wherein validating comprises comparing received user identification data with the user identification data.

17. The non-transitory computer readable storage medium as claimed in claim 10, wherein the method further comprises deassociating a user from the software application, wherein deassociating comprises deleting the user identification data.

18. The non-transitory computer readable storage medium as claimed in claim 17, wherein the method further comprises restoring a deassociated user, wherein restoring comprises:

receiving user identification data;

checking for license availability;

generating a second number and assigning the second number to the user identification data received if a license is available; and storing the user identification data in a database.

19. A system comprising:

a memory and at least one processor configured to perform:

receiving a request for at least one software application license for a software application by a computing apparatus comprising at least one processor and a readably coupled memory, wherein the request comprises a user count upper limit;

generating, by the computing apparatus, a set of license data in response to the request, wherein the set of license data comprises the user count upper limit, a security certificate associated with the software application, user details received from a user, and a corresponding sequence number, wherein the corresponding sequence number is in an arbitrarily determined range, and size of the range is equal to the user count upper limit;

signing the set of license data digitally with a private key;

embedding the set of signed license data into the software application;

performing registration for user identification data comprising a user identification string and a password string, wherein registration comprises (a)-(d):

(a) validating the license data, wherein validating the license data comprises validating the signed license data embedded into the software application;

(b) maintaining an active user count;

(c) checking availability of a license, wherein checking availability comprises comparing the active user count against the user count upper limit; and (d) associating the user identification data with the corresponding sequence number in the signed license data;

receiving a request to access the software application, wherein receiving the request comprises receiving registered user identification data through an input interface associated with the computing apparatus and signed license data;

validating the registered user identification data, wherein validating comprises (e)-(g):

(e) identifying the sequence number associated with the registered user identification data;

(f) comparing the corresponding sequence number associated with the registered user identification data with the corresponding sequence number in the signed license data; and (g) authenticating the registered user identification data, wherein authenticating comprises authenticating only if the corresponding sequence number associated with the registered user identification data and the corresponding sequence number in the signed license data match; and responsive to successfully validating the registered user identification data, providing access to the software application by the user identification string.

* * * * *